United States Patent [19]

Haas et al.

[11] 4,377,654

[45] Mar. 22, 1983

[54] POLYMERIZATION PROCESSES AND POLYMER COMPOSITIONS

[75] Inventors: Howard C. Haas, Arlington, Mass.; Robert D. Moreau, Nashua, N.H.

[73] Assignee: Polaroid Corporation, Cambridge, Mass.

[21] Appl. No.: 322,065

[22] Filed: Nov. 16, 1981

[51] Int. Cl.$^3$ ............................ C08K 5/17; C08F 2/06; C09D 3/04; C08L 89/00

[52] U.S. Cl. .................................. 524/236; 106/125; 106/163 R; 106/186; 526/220; 528/274

[58] Field of Search ........................ 526/220; 524/236; 106/186, 163, 12 R; 528/274

[56] References Cited

U.S. PATENT DOCUMENTS 3,522,335 7/1970 Rowley ............................... 106/186

OTHER PUBLICATIONS

"The Parachor and Chemical Constitution" Samuel Sugden and Henry Wilkins, Apr., 1929, *J. Chem. Soc.*, 1297.

"The Preparation and Heats of Combustion of Some Amine Nitrates" T. L. Cottrell and J. E. Gill, 1951, *J. Chem. Soc.*, 1798.

"Thermodynamics of Solution of Nonpolar Gases in a Fused Salt" D. F. Evans et al., *J. Chem. Soc.*, vol. 103, No. 2, 481.

*Primary Examiner*—Theodore Morris
*Attorney, Agent, or Firm*—Louis G. Xiarhos

[57] ABSTRACT

Alkyl ammonium nitrate fused salts of the formula

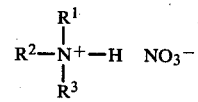

wherein $R^1$ is a substituted or unsubstituted alkyl group and $R^2$ and $R^3$ are each independently hydrogen or a substituted or unsubstituted alkyl group, which fused salts have melting points of up to about 125° C., are disclosed for use as solvents or swelling agents for polymers and as polymerization media for the conduct of polymerization reactions.

23 Claims, No Drawings

POLYMERIZATION PROCESSES AND POLYMER COMPOSITIONS

BACKGROUND OF THE INVENTION

The present invention relates to novel chemical processes and compositions. In particular, the present invention relates to novel polymerization processes utilizing certain alkyl ammonium nitrates as polymerization media and to novel polymer compositions utilizing the alkyl ammonium nitrates as solvents or swelling agents.

Various solvents are employed in polymer technology either as solvents or swelling agents for polymers or as solvents used in conducting polymerization reactions, i.e., as polymerization media. Water is often used for such applications and numerous other solvent systems, which can be aqueous, anhydrous, protic, or aprotic, can also be used.

Although a large number of solvents are known, they may not be altogether satisfactory for certain polymer technology applications. For example, a given monomer or polymer may be insoluble or difficultly soluble in the known solvents or it may be unstable or provide unstable solutions in those solvents in which it can be dissolved. With specific regard to polymerization processes, a given monomer polymerized in conventional polymerization solvents may provide only low molecular weight polymers or a low degree of polymerization. With regard to polymer solutions, a given polymer may display undesired properties in known solvents for that polymer such as aggregation or undesired polyelectrolyte behavior. Thus, there remains a continuing need in the art for new solvent systems which can be employed in polymer technology.

SUMMARY OF THE PRESENT INVENTION

In accordance with the present invention, it has now been discovered that certain fused salts can be employed as solvents, swelling agents, and polymerization media in polymer technology. Specifically, it has been discovered that an alkyl ammonium nitrate fused salt of the formula

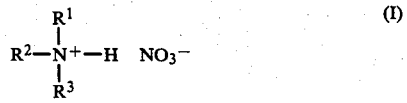

wherein $R^1$ is a substituted or unsubstituted alkyl group and $R^2$ and $R^3$ are each independently hydrogen or a substituted or unsubstituted alkyl group, which alkyl ammonium nitrate has a melting point of up to about 125° C., can be utilized as a solvent or swelling agent for polymers and as a polymerization medium for the conduct of polymerization reactions. The present invention relates to such utilization and, in particular, relates to the novel compositions and polymerization processes based upon such utilization.

Thus, in one of its process aspects, the present invention provides a polymerization process which comprises the steps of introducing a polymerizable monomer into an alkyl ammonium nitrate fused salt of formula (I) and effecting polymerization of the monomer. It has been found that a wide variety of known monomers can be polymerized in the alkyl ammonium nitrates of formula (I). A wide variety of the known types of polymers can accordingly be provided by the present process, such as polyacrylates, polyacrylamides, polyesters, polyamides, polyvinylketones, polyurethanes, polyvinylpyridines, various polyelectrolytes, and many other addition and condensation polymers.

In a product aspect, the present invention provides, as novel compositions, solutions comprising a polymer dissolved in an alkyl ammonium nitrate fused salt of formula (I). A wide variety of polymers can be dissolved in the alkyl ammonium nitrates of formula (I) and the resultant solutions can be employed in numerous areas of polymer technology, as described hereinafter.

In another product aspect, the present invention provides novel polymer compositions comprising a polymer and an alkyl ammonium nitrate of formula (I), wherein the polymer is swollen by the alkyl ammonium nitrate. The swollen polymer compositions can be employed in various polymer technology applications such as derivatization of the polymer or formation of interpenetrating polymer networks.

For a fuller understanding of the present invention, reference should be had to the following detailed description.

DETAILED DESCRIPTION OF THE INVENTION

In regard to fused salts generally, such materials are known and can be defined as salts existent in a molten or liquid state. The term "fused salt" is normally applied in description of the melt of a salt having a melting point of several hundred degrees centigrade.

The alkyl ammonium nitrates used herein may also be considered as melts of salts, but the melting points of these salts are in a relatively low range, i.e., up to about 125° C. Alkyl ammonium nitrates which are known and which melt below 125° C. include 2-hydroxyethylammonium nitrate (m.p. 52°-53° C.), dimethylammonium nitrate (m.p. 75.5°-76.5° C.), diethylammonium nitrate (m.p. 104°-105° C.), methylammonium nitrate (m.p. 110°-111.5° C.), and triethylammonium nitrate (m.p. 112°-114° C.). These salts and their melting points are reported by T. L. Cottrell et al., J.Chem. Soc., 1798 (1951). Since these alkyl ammonium nitrates have melting points above room temperature, they must be heated at least to the melting point prior to utilization in the products and processes of this invention.

A preferred fused salt for use in the present invention is ethylammonium nitrate,

which has a reported melting point of about 8° C. (S. Sudgen et al., J.Chem.Soc., 1297 (1929)) and, thus, exists as a liquid, or melt, at room temperature. This fused salt is preferred primarily because of its relatively low melting point, which provides a capability for practicing the present invention at temperatures as low as about 8° C. and, more importantly, at temperatures at or slightly above room temperature. Ethylammonium nitrate has been found to be useful as a polymerization medium for a wide variety of monomers and has also been found to be capable of dissolving or swelling a wide variety of polymers.

Further in regard to the melting points of the alkyl ammonium nitrates used herein, it will be appreciated that most polymerization reactions are conducted optimally at temperatures of less than 125° C. and that most polymer solutions are prepared at temperatures well below 125° C. The preparation of swollen polymer compositions is normally also accomplished at temperatures well below 125° C. However, if necessary, the alkyl ammonium nitrate may be heated to temperatures in excess of 125° C. to accomplish a desired purpose such as a desired degree of polymerization of a monomer or a desired degree of solubilization or swelling of a polymer.

The alkyl ammonium nitrates, being salts, are polar molecules. At least some of the alkyl ammonium nitrates are presumed to be capable of generating a three-dimensional hydrogen-bonded network to form a highly cross-linked liquid reminiscent of water. See, for example, the publication of D. F. Evans et al., J. Am. Chem. Soc., Vol. 103, No. 2, p. 81 (1981) wherein such characterization is applied to ethyl ammonium nitrate. The alkyl ammonium nitrates employed herein can be used to dissolve many of the monomers and polymers which are soluble in water or other polar solvents. Accordingly, the process of this invention is of particular interest for the solution polymerization of monomers which are capable of undergoing solution polymerization in water or other polar solvent systems and the solutions of this invention are of particular interest for the dissolution of polymers which are capable of being dissolved in water or other polar solvent systems. The use of an alkyl ammonium nitrate fused salt in such applications may be of advantage where the monomer or polymer displays undesired properties in water or other conventional polar solvents such as, in the case of monomers, instability, marginal solubility, low degrees of polymerization, or a tendency to undergo side reactions during polymerization or, in the case of polymers, instability, marginal solubility, undesired polyelectrolyte behavior, or undesired aggregation.

The $R^1$, $R^2$, and $R^3$ substituents materially contribute to the solubilizing or swelling properties of the alkyl ammonium nitrate. Different $R^1$, $R^2$, and $R^3$ substituents can be used to modulate the solubilizing or swelling properties of the fused salt and provide solubilizing or swelling properties suited to particular applications. An $R^1$, $R^2$, or $R^3$ substituent tending to decrease the polarity of the fused salt, for example, such as a relatively long chain alkyl group, can provide an increased capability for dissolution or swelling of relatively low polarity monomers and polymers. Conversely, an $R^1$, $R^2$, or $R^3$ substituent tending to increase the polarity of the fused salt, such as a hydrogen substituent, a relatively small alkyl group, or an alkyl group substituted with a polar group, e.g., hydroxyethyl, can provide an increased capability for dissolution or swelling of relatively high polarity monomers and polymers.

With specific regard to the process aspects of this invention, both addition and condensation polymerizations can be conducted in accordance with the present process. Both homopolymers and copolymers can be prepared. Although, as noted above, the present process is of particular interest for the solution polymerization of monomers which are capable of undergoing solution polymerization in water or other polar solvent systems, it should be understood that the present process is not limited to such monomers but applies generally to any monomer which is capable of undergoing polymerization in the alkyl ammonium nitrate medium.

Certain benefits may be realized in conducting a polymerization reaction in accordance with the present process. For example, the use of an alkyl ammonium nitrate as a polymerization medium may permit satisfactory polymerization of a monomer which cannot be satisfactorily polymerized in known polymerization media, thereby allowing preparation of a desired novel polymer. Process benefits may also be realized. For example, by substituting the alkyl ammonium nitrate for water as a polymerization medium, increased yields or higher degrees of polymerization may be obtained in the polymerization of water-sensitive monomers such as acid chlorides used in polycondensation reactions or monomers capable of undergoing hydrolytic cleavage.

A wide variety of the known ethylenically unsaturated monomers can be addition polymerized in accordance with the present process. Illustrative ethylenically unsaturated monomers which can be dissolved and polymerized in ethyl ammonium nitrate, for example, include acrylic acid, acrylamide, N-vinyl pyrrolidone, hydroxyethylacrylate, dimethylaminoethylacrylate, p-vinylbenzyltrimethylammonium chloride, 4-vinylpyridine, methylene malonamide, diacetone acrylamide, and methyl vinyl ketone. A wide variety of the known monomers which undergo condensation polymerization can also be polymerized in accordance with the present process. Monomers in this latter category include aliphatic dibasic acids, aliphatic and aromatic diols and their bischloroformates, hydroxy acids, diisocyantes, aromatic diacids and their esters and acid chlorides, aromatic diamines, bisphenols and their bischloroformates, aliphatic and aromatic thiols, thiocarbonyl compounds and carbonyl compounds such as formaldehyde. As further described below, certain properties of the alkyl ammonium nitrate fused salts permit preparation of condensation polymers by interfacial polymerization, such a polymerization technique often being the preferred method of preparing condensation polymers.

In its simplest form, the process of this invention can be conducted by introducing a monomer into an alkyl ammonium nitrate at a suitable temperature and allowing sufficient time for polymerization. The entire amount of monomer which is to be polymerized can be introduced at the start of the reaction or the monomer can be added in stages during the course of the polymerization. Copolymers can be prepared by introducing two or more comonomers into the fused salt, either simultaneously or sequentially.

The process of this invention can be a solution polymerization process wherein at least part of the amount of monomer which is introduced into the fused salt is dissolved therein and polymerization of the dissolved monomer is effected. Undissolved monomer may become solubilized and undergo polymerization as the polymerization reaction proceeds. As indicated above, the present process is of particular interest for the solution polymerization of monomers which are capable of undergoing solution polymerization in water or other polar solvents.

For free radical addition polymerizations conducted in accordance with this invention, it generally is necessary to employ some means of initiation to promote the reaction and achieve satisfactory reaction rates. Any of the conventional methods of promoting addition polymerization reactions can be used in the practice of the present process, including application of heat or radiation and use of the known free radical polymerization initiators.

In a typical free radical addition polymerization of an ethylenically unsaturated monomer, the monomer is introduced into the liquid salt, a free radical initiator is added, and the resultant mixture is heated to effect production of the polymer. The polymer may precipitate upon formation and be isolated by filtration, or, if soluble in the alkyl ammonium nitrate, by pouring the reaction mixture into a liquid which is a non-solvent for the polymer but which is miscible with the alkyl ammonium nitrate and recovering the thus-precipitated polymer. As indicated by Example 2 herein, the polymerization reaction mixture may also convert to an essentially solid mass and the polymer may be isolated by dissolution of the solid mass and precipitation of the solution into a liquid which is a non-solvent for the polymer but which is miscible with the alkyl ammonium nitrate.

Example 3 herein illustrates that dialysis procedures can be employed in aid of isolation of the polymer. Thus, the polymerization reaction mixture is added to water, the resultant solution is dialyzed against water, and the dialyzed solution is evaporated to isolate the solid polymer.

Free radical initiators which can be used to promote the addition polymerization include azobis(isobutyronitrile), 2,2'-azobis(2-amidinopropane)hydrochloride, and potassium persulfate. Redox combinations can also be used. Thus, an oxidizing agent such as sodium persulfate can be used in combination with a reducing agent such as cuprous sulfate, ferrous sulfate, sodium bisulfite or sodium metabisulfite. Polymerization can be effected employing a minimal amount of initiating agent, generally in the range of 0.1% to 5% by weight based on the weight of monomer.

Condensation polymerizations conducted in accordance with the present process may be carried out using solution polycondensation techniques whereby the monomer or comonomers are dissolved and condensed in the alkyl ammonium nitrate at a suitable temperature. The methodology of conducting solution polycondensation reactions is well known and, in general, may be applied in conducting the present process.

Interfacial polymerization may also be used to effect a condensation polymerization in accordance with the process of this invention. Interfacial polymerization is a well known and often preferred method of conducting polycondensation reactions. The method, as currently practiced, involves the use of two immiscible solvent phases, one a polar aqueous phase and the other a non-polar water-immiscible organic solvent phase. One of the two comonomers which are to be condensed is dissolved in the aqueous phase and the other is dissolved in the organic phase. The immiscible phases are contacted to effect polycondensation at their interface. Generally, a dibasic acid chloride, e.g., adipoyl chloride, sebacoyl chloride, phthaloyl chloride, terephthaloyl chloride, phosgene, or 1,4-cyclohexanedicarbonyl chloride, is the monomer dissolved in the organic phase and a difunctional monomer containing active hydrogens, such as an diol, diamine, or dithiol is dissolved in the aqueous phase. In the preparation of a polyester, for example, a dibasic acid chloride such as adipoylchloride is dissolved in the organic phase, e.g., in toluene, dichloromethane, or carbon tetrachloride, and a diol such as 1,4-butanediol is dissolved in water together with an acid acceptor. Polycondensation occurs very rapidly at the interface and is irreversible.

Inasmuch as the alkyl ammonium nitrates employed herein are polar materials which are immiscible with many non-polar organic solvents, a solution of a difunctional monomer in the liquid alkyl ammonium nitrate can be used as the polar phase of an interfacial polymerization system, i.e., as a replacement for the aqueous phase. Thus, the interfacial polycondensation can be effected by dissolving a first difunctional monomer which can undergo condensation polymerization in an alkyl ammonium nitrate of formula (I), dissolving a second difunctional monomer which can condense with the first monomer in an organic solvent which is immiscible with the alkyl ammonium nitrate, e.g., dichloromethane, chloroform, carbon tetrachloride, benzene, toluene, dibutyl ether, and the like; and contacting the resultant solutions to effect polycondensation of the respective monomers at the interface of the immiscible solutions. If desired, an acid acceptor such as pyridine may be added to the alkyl ammonium nitrate solution. Certain advantages may be realized by using an alkyl ammonium nitrate in place of water in such polymerizations, such as minimizing or preventing hydrolysis of a bibasic acid chloride which can occur using an aqueous polar phase. As a result, an increase in yield or molecular weight of the condensation polymer may be obtained.

Interfacial polycondensation reactions conducted in accordance with the process aspects of this invention are suited to the production of various types of polymers, including polyesters, polythioesters, and polyamides. Thus, a dibasic acid chloride, such as any of those named above, can be employed as the difunctional monomer in the organic phase and be condensed with a diol, dithiol, or diamine dissolved in the alkyl ammonium nitrate polar phase.

With regard to the employment of diamine monomers in solution and interfacial polycondensations conducted in accordance with this invention, it should be understood that aliphatic diamines, being relatively strong bases, may react with the alkyl ammonium nitrate, effectively interchanging with the amine or ammonium segment of the fused salt to form nitrate salts of the aliphatic diamine. Aromatic diamines, being weaker bases than aliphatic diamines, are considerably less likely to react with the alkyl ammonium nitrate and, thus, are preferred diamines for use in the polycondensation reactions of this invention.

As indicated above, the compositions of this invention include polymer solutions which employ an alkyl ammonium nitrate fused salt of formula (I) as a solvent. Any polymer which can be solubilized in the alkyl ammonium nitrate can be used in preparation of a solution of this invention. Both naturally occurring and synthetic polymers can be used. Polymers which can be solubilized in ethyl ammonium nitrate, for example, include poly-4-vinylpyridine, polyacrylamide, trifluoromethylpolyvinylalcohol, hydroxyethylcellulose, poly-2-vinylpyridine N-oxide, low molecular weight polymalonamido acrylamide, polypeptides such as the various types of gelatins, and polyelectrolytes such as polyvinylbenzyltrimethylammonium chloride, and sodium dextran sulfate. The solutions may be prepared simply by adding the polymer to the liquid fused salt and stirring and heating as necessary to effect dissolution. Solubilization of gelatin, for example, normally requires heating and stirring and finely ground gelatin is preferred. The solutions can also be prepared by conducting a polymerization reaction in accordance with the process aspects of this invention to prepare a polymer which is soluble in the alkyl ammonium nitrate polymerization medium.

The solutions of this invention can be true solutions, wherein all of the polymer present is solubilized in the fused salt to provide an essentially homogeneous solution, or the solutions can contain some undissolved polymer, e.g., in a swollen rather than a dissolved state. The solutions may contain additives other than the polymer, e.g., surfactants or viscosity-imparting agents, which may be present as soluble or insoluble species.

The solution of this invention can be employed in numerous polymer technology applications. The use of an alkyl ammonium nitrate as a solvent may permit facile solubilization of polymers which are insoluble or difficultly soluble in known solvents or allow preparation of higher concentration polymer solutions. Exemplary applications of the solutions are extrusion of the solution into a non-solvent for the polymer to form fibers and films; employment of the polymer solution for measuring the viscometric and osmotic properties of the dissolved polymer; dialysis applications; and as a reaction solution for modification or reaction of the polymer.

With regard to those polymers which are normally solubilized, measured, and utilized only in aqueous systems, e.g., gelatin and polyelectrolytes, it should be understood that the ability to prepare solutions of such polymers in a substantially anhydrous solvent such as an alkyl ammonium nitrate of this invention may prove beneficial in a number of respects including physical measurement of such polymers in an anhydrous solvent, e.g., of viscometric and osmotic properties, and simplification of interpretation of physical measurements; provision of a more stable solution of the polymer; or utilization of the polymer or polymer solution in processes and systems where aqueous solutions are normally employed but are not altogether satisfactory.

In accordance with another product aspect of this invention, there are provided swollen polymer compositions wherein an alkyl ammonium nitrate of formula (I) is employed as a swelling agent. Any polymer which is capable of undergoing swelling in the presence of the alkyl ammonium nitrate can be used in preparation of the compositions. Generally, the compositions are prepared by simply contacting the unswollen polymer with the alkyl ammonium nitrate fused salt and allowing sufficient time for swelling of the polymer to occur. Thus, the compositions can be prepared by contacting a pre-formed polymer with the alkyl ammonium nitrate or by conducting a polymerization reaction in accordance with the porous aspects of this invention to prepare a polymer which is swollen by the alkyl ammonium nitrate polymerization medium.

Polymers which are swollen upon contact with ethyl ammonium nitrate, for example, include polyvinylalcohol, polybenzyl-l-glutamate, Nylon-66, hydroxyethylnylon-66 (available from Belding Chemical Industries, Grosvenor Dale, CT as BCI Nylon No. 637) and water-soluble starch sold by Eastman Chemicals, Rochester, NY.

The swollen polymer compositions of this invention can be employed for reaction of the swollen polymer, whereby the swelling of the polymer facilitates contact with a derivatizing reagent. The swollen polymer compositions can also be employed in the preparation of interpenetrating polymer networks, whereby a monomer is introduced into the swollen polymer composition and polymerized therein so as to provide a network of the original swollen polymer and the newly formed polymer. The preparation of polymer networks by polymerization of a monomer in the presence of a swollen polymer, employing conventional swelling agents, is known in the art and is generally employed to provide polymer compositions having unique physical properties.

In the products and processes of this invention, the alkyl ammonium nitrates can be utilized in 100% concentration or mixed with miscible anhydrous protic or aprotic solvents, e.g., ethanol or acetone.

The alkyl ammonium nitrates of this invention are substantially anhydrous materials. However, they may contain minor amounts of water, e.g., on the order of about 0.1% to 5% by weight, provided that such minor amounts do not adversely effect conduct of the present process or preparation of the present compositions.

The anhydrous nature of the fused salts of this invention renders the present products and processes especially suited to polymer applications where an aqueous medium is unsuited. Accordingly, anhydrous or substantially anhydrous polymer solutions and swollen polymer compositions may be preferentially provided in accordance with the product aspects of this invention and anhydrous or substantially anhydrous polymerization reactions may be preferentially conducted in accordance with the process aspects of this invention.

The alkyl ammonium nitrates used herein can be prepared according to the procedures of T. L. Cottrell, et al., J. Chem. Soc., 1798 (1951).

The following examples are provided to further illustrate the present invention. Specific limitations in the following examples are intended as illustrative and not limitative.

EXAMPLE 1

Sixty-four milliliters of concentrated nitric acid (15 M. $HNO_3$) were diluted with 128 ml. of water and then added gradually, with stirring, to 65 g. of a 70% by weight aqueous solution of ethyl amine. The mixture was maintained at about 20° C. by ice-bath cooling during the nitric acid addition. The resultant solution was allowed to stand with a stream of air directed across the surface. After most of the water had evaporated, the liquid residue was placed in a desiccator containing phosphorus pentoxide as a desiccant and dried under vacuum to a constant weight. The resultant ethylammonium nitrate was a slightly yellowish liquid at room temperature of about 25° C. The melting point was determined to be about 4° C. by means of differential scanning calorimetry but was found to vary by several degrees depending on the rate of heating. The structure of the product was confirmed by nuclear magnetic resonance analysis.

EXAMPLE 2

One-half gram of acrylic acid was dissolved in 5 ml. of ethylammonium nitrate at room temperature in a 50 ml. round bottom flask equipped with a stopcock adapter. 5 mg. of potassium persulfate were then added and the flask was cooled in an ice bath and evacuated. The stopcock was then closed to maintain the internal vacuum and the flask placed in a 50° C. bath for about 16 hours. The flask was then cooled to about room temperature resulting in solidification of the reaction mixture. The clear, solid mass was dissolved with difficulty in about 200 ml. of methanol at room temperature. The methanol solution was gradually added to about 2000 ml. of acetone, with stirring, effecting precipitation of the polyacrylic acid as a white solid. The polyacrylic acid was redissolved in about 200 ml. of methanol and reprecipitated by gradual addition to about 2000 ml. of acetone. The polymer was collected by filtration and dried under vacuum, providing an essentially quantitative yield of polyacrylic acid. The infrared spectrum of the product was essentially identical to that of commercially available polyacrylic acid.

EXAMPLE 3

One-half gram of N-vinylpyrrolidone was dissolved in 5 ml. of ethylammonium nitrate at room temperature in a 50 ml. round bottom flask equipped with a stopcock adapter. 5 ml. of 2,2'-azobis(2-amidinopropane)hydrochloride (available from Crescent Chemical Co., Hauppauge, N.Y. under the tradename V-50) were added and the flask was cooled in an ice bath and evacuated. The stopcock was then closed to maintain the internal vacuum and the flask placed in a 50° C. bath for about 16 hours. The reaction solution was cooled to room temperature and poured into about 50 ml. of water. The resultant solution was dialyzed for about 8 hours against 3 l. of water employing a cellulose membrane. The 3 l. of water were then replaced with a second 3 l. of water and the dialysis continued for an additional 8 hours period. The dialyzed solution was then evaporated to dryness yielding about 250 mg. of a white, solid residue. The infrared spectrum of the residue was compared with that of commercially available poly-N-vinylpyrrolidone and indicated that the residue was poly-N-vinylpyrrolidone containing a small amount of residual ethyl ammonium nitrate.

EXAMPLE 4

Approximately equimolar amounts of 1,4-butanediol and pyridine were dissolved in ethylammonium nitrate and an approximately equimolar amount of adipoyl chloride was dissolved in carbon tetrachloride. The 1,4-butanediol solution was poured onto the adipoyl chloride solution at room temperature. Poly-n-butyladipate formed almost immediately at the interface of the immiscible solutions as a white film or precipitate.

EXAMPLE 5

One-half gram of methylene malonamide was dissolved in 5 ml. of ethylammonium nitrate at room temperature in a 50 ml. round bottom flask equipped with a stopcock adapter. 5 mg. of V-50 were added and the flask was cooled and evacuated as described in Example 3. The flask was placed in a 52° C. bath for about 60 hours. The reaction solution was then cooled to room temperature and about 100 ml. of isopropanol were added. The resultant hazy mixture was placed in a freezer resulting in deposition of a swollen precipitate on the walls of the flask. The supernatant liquid was decanted and the precipitate was dissolved in about 5 ml. of water and reprecipitated by addition of about 100 ml. of isopropanol and cooling in the freezer. The supernatant liquid was decanted and the precipitated polymer was dried under vacuum. The infrared spectrum of the product was consistent with polymethylene malonamide and indicated the presence of a small amount of residual ethylammonium nitrate.

EXAMPLE 6

A mixture of 5 ml. of ethylammonium nitrate and 5 mg. of potassium persulfate in a 50 ml. round bottom flask equipped with a stopcock adapter was flushed with nitrogen and 0.6 ml. of methyl vinyl ketone was then added. The mixture was cooled in a dry-ice/acetone bath, the flask was evacuated, and the stopcock closed to maintain the internal vacuum. The contents of the flask were allowed to melt at room temperature and the flask was then placed in a 50° C. bath for 3 days. Water was then added to precipitate the polymeric product. The supernatant liquids were decanted and the precipitated polymer was dissolved in acetone and reprecipitated by adding water to the solution. The supernatant liquids were decanted and the precipitate was dried under vacuum yielding 250 mg. of poly-methyl vinyl ketone. The infrared spectrum was consistent with the structure of poly-methyl vinyl ketone.

EXAMPLE 7

Ten milliliters of concentrated nitric acid (15 M. $HNO_3$) were diluted with about 90 ml. of water and then added gradually, with stirring, to a solution of 9.74 g. of 2-hydroxyethylamine in about 100 ml. of water. The temperature of the mixture was maintained at about 0°–5° C. by means of ice-salt bath cooling during the nitric acid addition. The resultant solution was allowed to stand at room temperature with a stream of air directed across the surface. After most of the water had evaporated, the oil-like residue was dissolved in ethanol and placed in a freezer, effecting formation of a solid. The ethanol was decanted and the solid was recrystallized twice from ethanol. The resultant 2-hydroxyethylammonium nitrate was a white solid at room temperature and melted at 51°–53° C.

The 2-hydroxyethylammonium nitrate prepared in Example 7 was a clear liquid when melted and heated to about 65° C. The liquid, at about 65° C., readily solubilized gelatin and poly-p-vinylbenzyltrimethylammonium chloride to form clear solutions. Polyvinylalcohol swelled rapidly when contacted with the liquid.

EXAMPLE 8

One-half gram of 4-vinylpyridine, 5 mg. of potassium persulfate, and 5 g. of the 2-hydroxyethylammonium nitrate prepared in Example 7 were added to a 50 ml. round bottom flask equipped with a stopcock adapter. The mixture was cooled in ice-water, evacuated, and the stopcock closed. The contents were heated gradually until a melt was formed. The flask was then cooled in ice-water. Polymerization was not evidenced by examination of the contents. The flask was thus again evacuated and sealed and heated at 70° C. for about 48 hours. The reaction mixture was cooled and water was added resulting in formation of a precipitate. The supernatant liquids were decanted and the precipitate was dissolved in methanol and re-precipitated by addition of water and a small amount of sodium chloride. The supernatant liquids were decanted and the precipitate was dried under vacuum, yielding about 310 mg. of poly-4-vinylpyridine. The infrared spectrum was consistent with the structure of poly-4-vinylpyridine.

What is claimed is:

1. A composition comprising a polymer dissolved in an alkyl ammonium nitrate fused salt of the formula

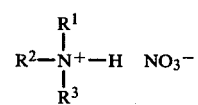

wherein $R^1$ is a substituted or unsubstituted alkyl group and $R^2$ and $R^3$ are each independently hydrogen or a substituted or unsubstituted alkyl group, said alkyl ammonium nitrate having a melting point of up to about 125° C.

2. A composition of claim 1 wherein said polymer is a polyelectrolyte.

3. A composition of claim 1 wherein said polymer is a polypeptide.

4. A composition of claim 3 wherein said polypeptide is gelatin.

5. A composition of claim 1 wherein said alkyl ammonium nitrate is ethylammonium nitrate.

6. A composition of claim 1 wherein said alkyl ammonium nitrate is 2-hydroxyethylammonium nitrate.

7. A polymerization process which comprises the steps of introducing a polymerizable monomer into an alkyl ammonium nitrate fused salt of the formula

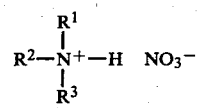

wherein $R^1$ is a substituted or unsubstituted alkyl group and $R^2$ and $R^3$ are each independently hydrogen or a substituted or unsubstituted alkyl group, said alkyl ammonium nitrate having a melting point of up to about 125° C., and effecting polymerization of said monomer.

8. A process of claim 7 wherein said monomer is an ethylenically unsaturated monomer which is capable of undergoing addition polymerization.

9. A process of claim 8 further comprising adding a free radical polymerization initiator to said alkyl ammonium nitrate.

10. A process of claim 7 wherein said monomer is capable of undergoing condensation polymerization.

11. A process of claim 7 wherein at least part of said monomer introduced into said alkyl ammonium nitrate is dissolved therein and polymerization of the dissolved monomer is effected.

12. A process of claim 7 wherein said alkyl ammonium nitrate is ethylammonium nitrate.

13. A process of claim 7 wherein said alkyl ammonium nitrate is 2-hydroxyethylammonium nitrate.

14. An interfacial condensation polymerization process which comprises the steps of dissolving a first difunctional monomer which is capable of undergoing condensation polymerization in an alkyl ammonium nitrate fused salt of the formula

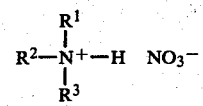

wherein $R^1$ is a substituted or unsubstituted alkyl group and $R^2$ and $R^3$ are each independently hydrogen or a substituted or unsubstituted alkyl group, said alkyl ammonium nitrate having a melting point of up to about 125° C.; dissolving a second difunctional monomer capable of condensing with said first difunctional monomer in an organic solvent which is immiscible with said alkyl ammonium nitrate; and contacting the resultant solutions to effect condensation polymerization of said first and second monomers at the interface of said solutions.

15. A process of claim 14 wherein an acid acceptor is added to said alkyl ammonium nitrate.

16. A process of claim 15 wherein said second difunctional monomer is a dibasic acid chloride.

17. A process of claim 16 wherein said first difunctional monomer is an aliphatic diol.

18. A process of claim 17 wherein said aliphatic diol is 1,4-butanediol.

19. A process of claim 18 wherein said dibasic acid chloride is adipoyl chloride.

20. A process of claim 14 wherein said alkyl ammonium nitrate is ethylammonium nitrate.

21. A composition comprising a polymer and an alkyl ammonium nitrate of the formula

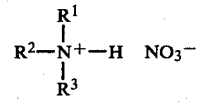

wherein $R^1$ is a substituted or unsubstituted alkyl group and $R^2$ and $R^3$ are each independently hydrogen or a substituted or unsubstituted alkyl group, said alkyl ammonium nitrate having a melting point of up to 125° C., wherein said polymer is swollen by said alkyl ammonium nitrate.

22. A composition of claim 21 wherein said alkyl ammonium nitrate is ethylammonium nitrate.

23. A composition of claim 21 wherein said alkyl ammonium nitrate is 2-hydroxyethylammonium nitrate.

* * * * *